Nov. 20, 1923.　　　　　　　　G. H. HINES　　　　　　　　1,474,823
FISH LURE
Filed Sept. 27, 1922
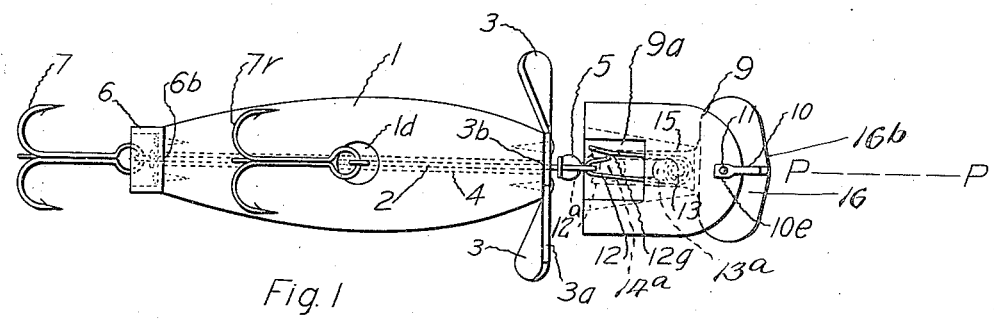
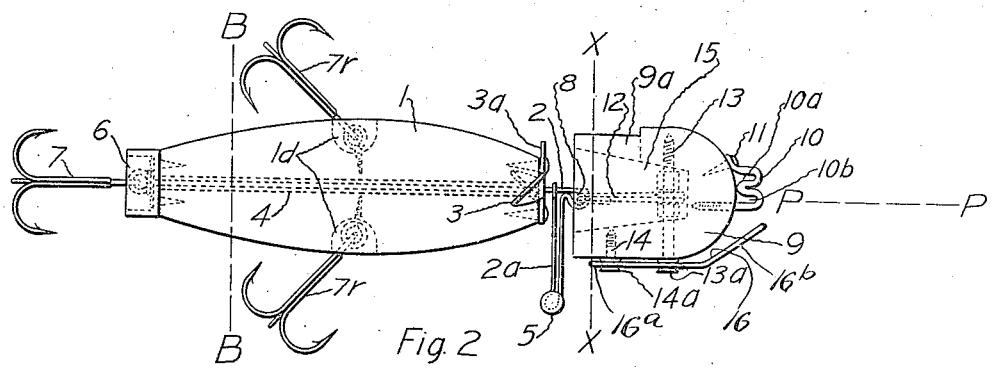
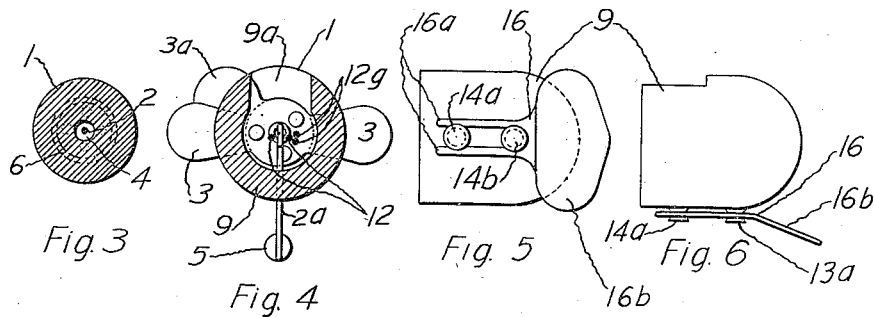
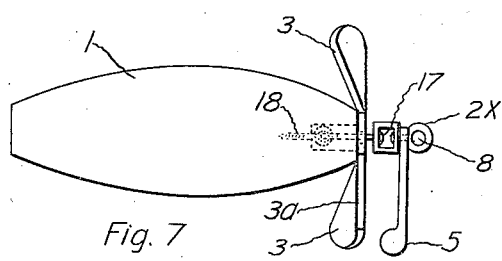
Gail H. Hines
Inventor Patented Nov. 20, 1923.

1,474,823

UNITED STATES PATENT OFFICE.

GAIL H. HINES, OF LAKE ODESSA, MICHIGAN.

FISH LURE.

Application filed September 27, 1922. Serial No. 590,825.

*To all whom it may concern:*

Be it known that I, GAIL H. HINES, a citizen of the United States, and resident of Lake Odessa, in the county of Ionia and State of Michigan, have invented certain new and useful Improvements in Fish Lures, of which the following is a specification.

The invention relates to a combination fish lure having novel means to quickly alter the size, shape, and functioning of the same, and to provide a life-like fish bait having a variegated, rotary body with hooks rotatively carried on the rotary body.

The invention has for its principal object the provision of an improved fish lure which rotates the variegated, rotary body in a novel and unusual manner as is hereinafter fully described.

Other objects of the invention are to provide attachments whereby the size, shape, and manner of operation of a fish lure may be varied to meet different requirements; some of the novel features being means to impart wabbling movement, means to provide a wiggling fish lure, means to provide a diving and zig-zagging fish lure, and means for varying the depth of the course of a fish lure.

I attain these and other objects by the mechanism illustrated in the accompanying drawing, in which—

Figure 1 is a top plan view illustrating one example of my improved device;

Fig. 2 is a side view thereof;

Fig. 3 is a cross section taken on the line B—B of Fig. 2;

Fig. 4 is a cross section taken on the line X—X of Fig. 2;

Fig. 5 is a fragmentary bottom plan view illustrating a flange attachment in attached position;

Fig. 6 is a fragmentary side view showing the flange attachment in one of its attached positions;

Fig. 7 is a fragmentary side view illustrating a modified form of means for joining a rotary body and non-rotative element as required in my device.

Referring to the drawings the rotary body 1 is carried on a shaft 2 of suitably heavy wire which passes through the longitudinal hole 4 in said body, and this body 1 carries a rear bearing $6^b$ in a cupped tail element 6, and a forward bearing $3^b$ is carried in a propeller element 3. A treble hook 7 is swingingly connected with the rear end of the shaft 2 and is limited in its swinging movement by the cupped element 6 secured to the rear end of the body 1. The treble hooks $7^r$ are swingingly carried on the rotary body 1 and are limited in their swinging movements by being partly carried within the depressions $1^d$, and both the body 1 and the hooks $7^r$ are revolved by a propeller secured to the forward end of said body and having its blades 3 inclined in the ordinary manner to produce rotation. Projecting laterally from one of the propeller blades 3 is an extension $3^a$ disposed perpendicular to the line of pull P—P, and this extension $3^a$ is integral with and revolves with the propeller 3 functioning to give wabbling movement to the body 1.

On the forward end of the shaft 2 an eye 8 is formed from a continuation of said shaft and a weight 5 is secured at the outer or lower end of an arm $2^a$ depending angularly from the shaft 2, and this arm $2^a$ is also formed from a continuation of the shaft 2. This arm $2^a$ also serves as a guard to prevent the head element 9 from coming in contact with the propeller 3 when the construction provides a body 1 having its forward end more buoyant than its rear end.

The head element 9 is detachably connected to the shaft 2 by means of a guarded hook 12 which is swingingly attached to said head element, and the connection to the shaft 2 is flexible and is made by the swinging hook 12 being engaged within the eye 8. The hook 12 is prevented from being disengaged from the eye 8 by means of a guard $12^g$ integrally formed with said hook from a single piece of suitable wire, one end of which is shaped to form the hook and the other end to form the guard which resiliently contacts with the outer terminal portion of the hook. The hook 12 is of single wire while the guard end $12^g$ is double for a suitable portion of its length and disposed so that the double or broad side of the guard bears against the outer terminal portion of the hook 12, and this guard $12^g$ is extended for a suitable length and flares outwardly from the hook 12 to facilitate entering the eye 8.

A duplex screw hook 10 is secured on the forward end of the head element 9, and this screw hook is formed from a single length of suitably heavy wire, one end of which is gimlet pointed and screw threaded, and above the threaded portion it is bent at a suitable angle and doubly crimped, and has the terminal end flattened and a small hole punched through said flattened end, and this screw hook 10 is secured by being turned into the head element 9 until the crimped hooks are disposed upwardly and the flattened terminal end 10ᵉ registered against the head element 9 where it is held secured by the small screw 11, substantially forming eye holes 10ᵃ and 10ᵇ one above the other.

The screws 13 and 14 turned into the bottom of the head element 9 have annularly grooved heads 13ᵃ and 14ᵃ, and the screw 13 swingingly connects the hook 12 to the head element 9.

A bifurcated flange element 16 slides astride the grooved heads 13ᵃ and 14ᵃ of the screws 13 and 14 so that the inner edges of the prongs 16ᵃ register in the grooves of said grooved heads, and the flange element 16 is frictionally held secured to the head element 9 until it is desired to detach it, and a portion 16ᵇ of this flange element 16 is angularly disposed relative to the line of pull P—P, and disposed so that it does not produce rotation.

For the construction shown in Fig. 7 of the drawings I employ a swivel 17 and a screw eye 18 as means for connecting a rotary body 1 to a non-rotative eye element 2ˣ.

In the operation and use of my improved device when a simple, rotating, wabbling lure is desired I attach directly through the eye 8 a draw line such as is commonly used for trolling or bait casting, and in this case the head element 9 and flange element 16 are detached and are not used. When the lure is drawn through water a resistance against the propeller blades 3 causes the body 1 to rotate, and a resistance against the propeller extension 3ᵃ causes said body to wabble. The weight 5 is maintained drawn downward and prevents the shaft 2 from being rotated.

When a wiggling fish lure is desired I detach the draw line from the eye 8 and attach the head element 9 by raising the guard 12ᵍ of the hook 12 and passing said hook through said eye. Then I attach the draw line to the eye 10ᵇ of the head element 9.

When it is desired that the course of the lure be maintained more nearly the surface of the water the flange element 16 is attached to the bottom of the head element 9 by passing the bifurcated end astride the grooved screw heads 13ᵃ and 14ᵃ, and disposed so that the angularly bent portion 16ᵇ is inclined upward.

When the course is to be maintained considerably below the surface the flange element 16 is reversed and the angularly bent portion 16ᵇ is disposed inclined downward.

Then if I wish the lure to dive and zigzag I simply detach the draw line from the lower eye 10ᵇ and attach it through the upper eye 10ᵃ of the head element 9.

A space 9ᵃ formed in a cut-away portion of the head element 9 is suitably disposed to facilitate detaching said head element from the shaft 2 when desired.

My improved lure is very attractive when enameled with any combination of bright colors such as are commonly used for the purpose; however, I have found an excellent color effect to be red, white, and yellow, applied in three, distinct, longitudinal stripes on the body 1, and the head element 9 of white with dashes of red. For night use luminous paint may be substituted for the white. The flange element 16 and other metal trimmings are preferably of nickel-plated metal.

While I have illustrated and described a fair working example of my improvements I do not wish to be understood as confining myself to the specific details of construction and formation of the elements shown, as under the spirit of my invention I believe that I am entitled to employ a wide variation of detail such as may fall within the scope of the appended claims.

Having thus described my invention, what I claim as new and desire to secure by Letters Patent, is:—

1. In a variegated fish lure, the combination of a non-rotative element, a rotary body joined to said non-rotative element, means for rotating said rotary body, and means for giving wabbling movement to said rotary body and said non-rotative element, and hook means attached to said fish lure.

2. In a variegated fish lure, the combination of a non-rotative element, a rotary body joined to said non-rotative element, and means for rotating said rotary body relative to said non-rotative element, a head element flexibly attached to said non-rotative element and means for attaching a line to said head element, means to give wiggling movement to said fish lure, and hook means carried by said fish lure.

3. In a variegated fish lure, the combination of a non-rotative element, a rotary body joined to said non-rotative element, and means for rotating said rotary body, a head element attached to said non-rotative element and means for attaching a line to said head element, means to give wiggling movement to said fish lure, means to give diving and zig-zagging movement to said fish lure, and hook means attached to said fish lure.

4. In a variegated fish lure, the combination of a non-rotative element, a rotary body, a head element attached to said non-rotative element, means for attaching a line to said head element, means to give wiggling movement to said fish lure and means to vary the depth of the course of said fish lure, and hook means revolvably mounted on said fish lure.

5. In a variegated fish lure the combination of a non-rotative element, a rotary body, and a head element, means for quickly detaching said head element, and means for imparting wiggling movement to said combined fish lure, and hook means revolvably mounted on said fish lure.

6. In a variegated fish lure the combination of a non-rotative element, a rotary body, and a head element, means for imparting wiggling movement to said fish lure, means for giving diving and zig-zagging movement to said fish lure and means for quickly detaching said diving and zig-zagging means, and hook means attached to said fish lure.

7. In a variegated fish lure the combination of a non-rotative element, a rotary body, and a head element, means for imparting wiggling movement to said fish lure, detachable means for giving diving and zig-zagging movement to said fish lure and means for converting said diving and zig-zagging means into means for varying the depth of the course of said fish lure, and hook means carried on said fish lure.

Signed at Beaverton, in the county of Gladwin and State of Michigan, this 23rd day of September A. D. 1922.

GAIL H. HINES.